July 29, 1952
C. M. HINES
2,605,334
CIRCUIT INTEGRITY INDICATING SYSTEM
Filed May 29, 1951
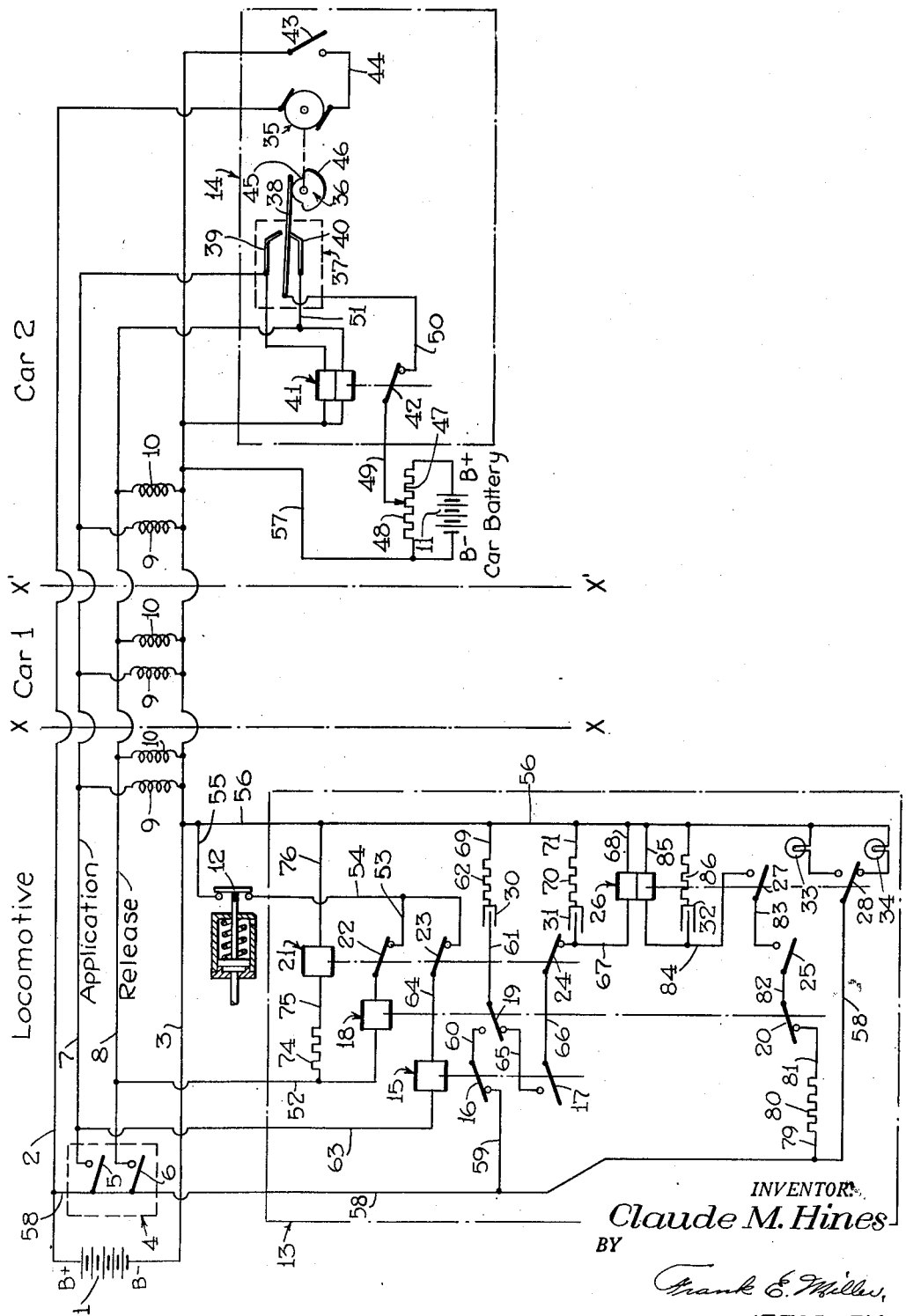
INVENTOR.
Claude M. Hines
BY
Frank E. Miller,
ATTORNEY Patented July 29, 1952

2,605,334

UNITED STATES PATENT OFFICE 2,605,334

CIRCUIT INTEGRITY INDICATING SYSTEM

Claude M. Hines, Verona, Pa., assignor to Westinghouse Air Brake Company, a corporation of Pennsylvania Application May 29, 1951, Serial No. 228,856

11 Claims. (Cl. 177—311)

1

This invention relates to a circuit checking means, and, more particularly, to an apparatus adapted to be associated with the control circuits of an electro-pneumatic brake apparatus employed on a train of cars for selectively signalling the integrity or lack of integrity of the said control circuits.

The present electro-pneumatic brake systems in use on a train of cars employ control wires or circuits which extend from the locomotive or control car at the head end of the train through all the cars in the train. These control wires (usually four in number called the battery supply wire, the common return wire, the application wire and the release wire) complete control circuits which normally include two magnet valves, commonly called the application magnet valve and a release magnet valve, on each car of the train, said magnet valves being controlled by a common electro-pneumatic controller which is usually located on the locomotive.

The desirability of continuously indicating the integrity or lack of integrity of the electrical control circuits has been previously recognized, and various means and methods have been proposed and employed for this purpose. One such apparatus is described and claimed in my prior copending application, Serial No. 102,836, filed July 2, 1949, now Patent No. 2,573,442.

It is an object of the present invention to provide an improved circuit checking apparatus of the type disclosed in the above mentioned application, characterized in that it is simple in construction, economical to manufacture, efficient in operation, and relatively free from operating and maintenance difficulties.

Other objects which will be made apparent in a subsequent description of my invention, are obtained by apparatus to be hereinafter described when read in connection with the accompanying drawing wherein the single figure shows a diagrammatic view of a simplified electric control apparatus embodying my novel circuit checking and signalling system as applied to the circuits of a simplified electric brake control system.

While a simplified brake control is shown in the drawing for the purpose of illustrating the nature and utility of my novel circuit checking system, it will be understood that the apparatus illustrated and described herein is intended to and may be applied to and function with conventional brake control equipment as well as various other types of control circuits.

The control circuits shown in the single figure serve to control several units such as the brake control magnet valves of a train. These control circuits represent the application and release control circuits and include a battery supply wire and a common return wire.

For simplicity I have shown diagrammatically in the drawing, a locomotive and two cars designated respectively as car 1 and car 2, the car 2 being taken as the last car of a train, car 1 representing the cars interposed between the last car of a train and the locomotive, and shown on the drawing interposed between the lines x—x and x'—x'.

Description

In the drawing, the simplified electric brake control apparatus comprises a source of direct current voltage, such as a battery 1, on the locomotive, battery supply wire 2, a return wire 3, a master controller device shown herein as a two-pole master switch 4 having an application contact 5 and a release contact 6, the contacts 5 and 6 being adapted to be connected respectively to the application wire 7 and the release wire 8 which extend throughout the train and to which are respectively connected the application magnet valve winding 9 and the release magnet valve winding 10 on each car of the train, and a car battery 11 on the last car (car 2) of the train. Also included in the brake control apparatus is a pneumatically operated switch 12 which is adapted to be opened, when the train brakes are applied, in response to the pressure of fluid supplied thereto, as from a brake control pipe not shown. Switch 12 may open when the fluid pressure supplied thereto exceeds an initial low pressure, such as five pounds per square inch, and be restored to closed position when the supply of fluid pressure reduces below such pressure, incidental to the release of the brakes.

It can be seen from the drawing that when switch 4 is positioned so that neither of its contact members 5 or 6 are closed, a position referred to as the brake release position, the circuit to the magnet valve windings 9 and 10 is incomplete. When switch 4 is positioned so that both contacts 5 and 6 are closed, a position referred to as the application position, both magnet valve windings 9 and 10 are energized. When only the release contact member 6 is closed, a position referred to as the "lap" position, only the release magnet valve winding 10 will be energized. It should be understood that the release magnet valve winding 10 is effective when energized to actuate a valve to close off the exhaust connection to a brake cylinder (not shown) and that the application magnet valve winding 9 is effective when energized to open a valve to supply fluid under pressure to the brake cylinder thereby to effect a brake application.

The circuit checking and signalling apparatus shown in the drawing is in simplified form and may be embodied in or attached to a suitable casing 13 on the locomotive and a casing 14 on the last car. Carried in the casing 13 are a relay 15 having two contact members 16 and 17, a relay 18 having two contact members 19 and 20, a relay 21 having four contact members 22, 23, 24 and 25, a two-winding relay 26 having two contact members 27 and 28, three condensers 30, 31 and 32, an "all-clear" lamp 33, and a fault lamp 34. Carried in the casing 14 on the last car are a code transmitter motor 35 of any suitable type, such as a permanent magnet field motor, a cam 36 rotated by the motor 35 for oscillating a resilient contact member 38 of a switch 37, and a two-winding relay 41 having a single contact member 42.

The resilient contact member 38 of switch 37 is disposed between two stationary contact members 39 and 40, and is inherently biased into contact with contact member 40. Cam 36 is effective, upon rotation to actuate contact member 38 into engagement with the contact member 40 and then allow it to reengage contact member 39, respectively. The cam 36 may have any desired number of high points and low points, the frequency of oscillation of the contact member 38 increasing with an increasing number of high points and low points. However, in the drawing, only one low point and one high point are shown, namely the low point 45 and the high point 46. It will be apparent that when the low point of cam 36 engages contact member 38 of switch 37, the said contact member is biased inherently into engagement with contact member 40 of said switch, and when the high point 46 engages the contact member 38, said contact member is shifted into engagement with contact member 39 of said switch.

*Operation*

Assuming the master switch 4 to be in brake release position, the apparatus is conditioned for operation by starting the code transmitter motor 35. This is done by closing suitable switch 43. Switch 43 completes a circuit for the motor 35 from the battery 1 by way of the battery supply wire 2, armature winding of motor 35, wire 44, switch 43, and return wire 3 to the battery 1. With the motor 35 running, mechanically connected cam 36 will rotate, thereby effecting an oscillatory movement of the contact member 38 of the switch 37 to alternately engage the contact members 39 and 40 of said switch.

With the contact member 38 in engagement with contact member 40 of switch 37, a circuit is completed from a resistance potentiometer 48, providing a desired portion of the total terminal voltage of the car battery 11, to transmit a low voltage from said resistance potentiometer throughout the train to the locomotive via the release wire 8, to thereby energize and pick-up relay 18 on the locomotive. The circuit for energizing the winding of relay 18 can be traced from a tap 47 of the resistance potentiometer 48, via wire 49, closed contact member 42 of relay 41 (which is deenergized until a brake application is made as will be later explained), wire 50, contact member 38, contact member 40, wire 51, release wire 8 throughout the train to the locomotive, wire 52, the winding of relay 18, closed contact member 22 of relay 21 (which is deenergized until a brake application is made as will be explained), wire 53, wire 54, closed switch 12, wire 55, wire 56, return wire 3 throughout the train to the rear car (car 2) and wire 57 to the resistance potentiometer 48.

It is to be noted that relay 21 is not picked-up at this time, although the winding thereof is connected in parallel with the winding of relay 18, because resistor 74 in series with the winding of relay 21 limits the current from the car battery 11 to a value insufficient to cause pick-up of the relay 21. Relay 21 is however, picked-up, under the control of the master switch 4, during a brake application, as will be hereinafter described.

With relay 18 energized and picked-up, the contact member 19 of said relay will be in its upper closed position, thus completing the circuit for charging the condenser 30, which circuit extends from one terminal of the battery 1, by way of battery supply wire 2, wire 58, wire 59, closed contact member 16 of relay 15, wire 60, contact member 19 of relay 18, wire 61, condenser 30, resistor 62, wire 69, wire 56, and return wire 3 to the opposite terminal of battery 1.

Thus, with contact member 38 of switch 37 in engagement with contact member 40 of said switch, the relay 18 is energized and picked-up, and the condenser 30 is charged.

When contact member 38 of switch 37 disengages contact member 40 and engages contact member 39 of said switch, the previously described circuit for energizing the winding of relay 18 is interrupted and a circuit is completed from the resistance potentiometer 48 throughout the train to the locomotive via the application wire 7, to energize the winding of relay 15 and to cause said relay 15 to be picked-up. The circuit for energizing the winding of relay 15 can be traced from the tap 47 of the resistance potentiometer 48, wire 49, closed contact member 42 of relay 41 (which is deenergized until a brake application is made as will be explained), wire 50, contact member 38, contact member 39, application wire 7 throughout the train to the locomotive, wire 63, winding of relay 15, wire 64, closed contact member 23 of relay 21, wire 54, closed switch 12, wire 55, wire 56, return wire 3 throughout the train to the rear car (car 2) and wire 57 to the resistance potentiometer 48.

With relay 15 energized and picked-up, the contact member 16 of said relay will be opened and the contact member 17 closed. Contact member 16 is effective in its picked-up or open position to insure the interruption of the charging circuit for condenser 30, in the event that contact member 19 of relay 18 fails, for any reason, to return back to its down-closed position just prior to the opening of contact member 16, as it should do normally. Contact member 17 is effective in its picked-up or closed position to establish a circuit for discharging condenser 30, as will be explained more in detail later on.

It should be noted herein, that due to the contact member 38 of switch 37 engaging the contact members 39 and 40 of said switch alternately, the relay 15 will be energized while relay 18 is deenergized and vice versa. Thus, while relay 15 is energized and contact member 17 of said relay closed, the relay 18 is deenergized and the contact member 19 is in its down-closed position, thereby completing a circuit for charging the condenser 31 and energizing the top winding of relay 26 by current discharged from the condenser 30 through the wire 61, contact member 19 of relay 18, wire 65, closed contact member 17 of relay 15, wire 66, closed contact member 24 of relay 21, wire 67, the top winding of relay 26, wire 68, wire 56, and wire 69, and resistor 62 back to the condenser 30. The condenser 31, resistor 70, and wire 71 are connected in parallel with the top winding of relay 26, and the condenser 31 is thus charged simultaneously with the energization of the top winding of relay 26.

With the top winding of relay 26 energized, the relay 26 will be picked-up, thus closing contact member 27 of said relay and shifting contact member 28 of said relay to its upper-closed position. Contact member 28 completes a circuit for energizing the "all-clear" lamp 33 by way of a circuit extending from battery 1, to battery supply wire 2, wire 58, contact member 28 in its upper-closed position, "all-clear" lamp 33, wire 56, and return wire 3 back to the battery 1.

When contact member 38 of switch 37 is shifted back into engagement with contact member 40, relay 15 is deenergized and relay 18 is again energized as was previously explained, thus repeating the cycle described as long as no fault occurs, or until a brake application is made. When relay 15 is deenergized and relay 18 is again energized, the respective contact members of said relays again cooperate to charge the condenser 30, as previously described. At the same time, the condenser 31, in parallel with the top winding of relay 26, discharges through the top winding of relay 26 to maintain relay 26 energized and picked-up during the interval elapsing with the relays 15 and 18 assuming their respective positions in which the condenser 30 again discharges to the condenser 31 and the top winding of relay 26. Thus, the relay 26 is maintained picked-up constantly, as relays 15 and 18 are alternately energized and deenergized, thereby causing the "all-clear" lamp 33 to remain energized as previously described.

The description thus far has been under the assumption that no circuit fault is present. However, if a fault occurs, such as a break in either the battery supply wire 2 or return wire 3, or a short circuit between said two wires, it is evident that the code transmitter motor 35 will cease operating, thereby stopping oscillation of the switch contact member 38. If the break occurs in the return wire 3, the circuits for energizing both the relays 15 and 18 will be interrupted, thereby causing the deenergization of both of said relays, even though contact member 38 engages either contact members 39 or 40, when the motor 35 stops. Thus the circuit for charging the condenser 30 is interrupted, and the circuit for discharging the condenser 31 through the top winding of relay 26 is interrupted. As soon as the charge of the condenser 31 is depleted through the top winding of relay 26, said relay will drop out causing the contact member 28 of said relay to move to its down-closed position in which a circuit is completed for energizing the fault lamp 34 and indicating said fault.

If a break occurs in the battery supply wire 2, the contact member 38 of switch 37 may stop in engagement with either contact member 39 or 40 such that either one, but only one, of said circuits for energizing the relays 15 and 18 will remain energized and the other of said circuits will remain deenergized. For purposes of illustration assuming that the contact member 38 of switch 37 stops in engagement with contact member 40 of said switch, the circuit for energizing relay 18 remains intact and the circuit for energizing relay 15 remains interrupted such that the circuit for charging condenser 30 remains established and the circuit for discharging condenser 30 through the top winding of relay 26 remains interrupted. As a result, the relay 26 drops out when the charge on the condenser 31 is depleted through the top winding of relay 26 thus effecting the energizing of the fault lamp 34.

Similarly, assuming that the contact member 38 of switch 37 stops in engagement with contact member 39 of switch 37, the relay 15 remains energized and the relay 18 remains deenergized. Thus the circuit for charging the condenser 30 remains interrupted, and consequently as soon as the charge is depleted from condensers 30 and 31 through the top winding of relay 26, the relay 26 will drop out, thereby effecting the energization of the fault lamp 34.

If a break occurs in the application wire 7, or a short circuit occurs between the application wire 7 and return wire 3, the current supply from car battery 11 for energizing the relay 15 fails but the circuit for energizing the relay 18 remains unaffected, thereby causing relay 15 to be deenergized and relay 18 to be energized intermittently. Thus the circuit for discharging the condenser 30 through the top winding of relay 26 remains interrupted, resulting in energization of the fault lamp 34 as explained previously.

If a break occurs in the release wire 8 or a short circuit occurs between the release wire 8 and the return wire 3, the current supply for energizing the relay 18 fails but the circuit for energizing relay 15 remains unaffected, thereby causing relay 18 to remain deenergized and the relay 15 to be energized intermittently. Thus the circuit for charging condenser 30 remains interrupted, resulting in energization of the fault lamp 34 as previously explained.

If a short circuit occurs between the application wire 7 and release wire 8, the voltage normally transmitted from the resistance potentiometer 48 through the release wire 8 will be transmitted through both of said wires, and the voltage normally transmitted through the application wire 7 from the resistance potentiometer 48 will also be transmitted to both of said wires. Thus with a short circuit between these two wires, both relays 15 and 18 will be energized simultaneously and continuously, with the result that the condenser 30 will be prevented from being charged and also unable to be discharged, thus effecting drop-out of relay 26 and energization of the fault lamp 34 as previously explained.

Thus far, the description has been limited to operation of the circuit checking apparatus while the brakes are released. If a brake application is made, a further operation occurs which will now be described. Upon actuation of master switch 4 to effect a brake application, the relay 41 on the rear car (car 2) becomes actuated to its picked-up position by reason of the energization of both the upper winding and the lower winding thereof. The upper winding of relay 41 is connected across the application wire 7 and return wire 3 in parallel relation to the application magnet valve windings 9 and is accordingly energized as a result of the closing of the contact member 5 of the master switch 4. The lower winding of relay 41 is connected across the release wire 8 and return wire 3 in parallel relation to the release magnet valve windings 10 and is accordingly energized as a result of the closing of the contact member 6 of the master switch 4. With contact member 42 of relay 41 actuated to its picked-up, that is, open position, the connection from the tap 47 on the resistance potentiometer 48 to the contact member 38 of switch 37 is interrupted. Thus, although the contact member 38 of switch 37 continues to oscillate, the checking voltage impulses transmitted from the resistance potentiometer 48 over train wire 7 or 8 are interrupted or terminated. It should be noted here that both windings of the relay 41 are energized to assure pick-up of relay 41 and also to obtain a faster "snap-action" pick-up of said relay when a brake application is made. However, only the lower winding of said relay is used to maintain said relay energized in "lap" position of the master switch 4 due to the fact that only the release circuit is energized as previously described.

Also when a brake application is made, and in "lap" position of the master switch 4, the relay 21 on the locomotive is actuated to its picked-up position by reason of the energization of the winding thereof. Winding of relay 21 is connected between the release wire 8 and return wire 3 in parallel relation to release magnet valve windings 10 by a circuit including wire 52, voltage limiting resistor 74, wire 75, the winding of relay 21, wire 76, and wire 56, and is accordingly energized as a result of the closing of the contact member 6 of the master switch 4. It will be understood that the voltage of battery 1 is sufficiently higher than that of the checking voltage supplied by the potentiometer 48, that voltage limiting resistor 74 is ineffective to prevent adequate current to be supplied from battery 1 to cause pick-up of relay 21.

With relay 21 energized and picked-up, the contact members 22 and 23 of said relay will be opened to interrupt the circuits for energizing the relays 18 and 15, respectively, the contact member 24 of relay 21 will be opened interrupting the circuit for energizing the top winding of relay 26, and charging condenser 31, and the contact member 25 of the relay 21 will be closed thus completing a circuit for energizing the relay 26 as will be presently explained. As the contact member 24 of relay 21 is opened, the circuit previously described for energizing the top winding of relay 26 is interrupted (assuming no circuit fault already exists), and condenser 31 will thus discharge current for a sufficient time to maintain the top winding of relay 26 energized until the lower winding of said relay is energized as now described. Contact member 25 of relay 21 is effective in its picked-up, that is, closed position to establish a circuit for energizing the lower winding of relay 26, which circuit extends from battery 1 by way of battery supply wire 2, wire 58, wire 79, voltage limiting resistor 80, wire 81, closed contact member 20 of relay 18, wire 82, closed contact member 25 of relay 21, wire 83, closed contact member 27 of relay 26, wire 84, the lower winding of relay 26, wire 85, wire 56, and return wire 3 to the battery 1. Thus the relay 26 is maintained energized and the contact members of said relay picked-up during a brake application, provided no fault existed at the time a brake application was initiated. Contact 28 of relay 26 is thus effective to maintain the circuit for energizing the "all-clear" lamp 33. Simultaneously with the energizing of the lower winding of relay 26, a time delay circuit consisting of condenser 32 and resistor 86 in parallel with said lower winding of relay 26 is energized and a condenser 32 is charged for a purpose described presently.

In order to insure the interruption of the circuit for energizing relays 15 and 18 while a brake application is in effect, pneumatically operated switch 12 is provided. It will be understood that the opening of switch 12 responsively to the supply of fluid under pressure thereto while a brake application is in effect, interrupts the energizing circuit for the windings of the relays 15 and 18 to that end.

When a brake release is made after a brake application, the contact member 6 of master switch 4 is opened thus deenergizing relay 21 and causing contact member 25 of said relay to open. With contact member 25 of relay 21 opened, the circuit previously described for energizing the lower winding of relay 26 is interrupted, and the condenser 32 will thus discharge a current for a short time interval to maintain the lower winding of relay 26 energized until the top winding of said relay is energized as previously explained.

It should be noted that during a brake application, the indicating lamp 33 or 34, whichever one was lit when the brake application was initiated, remains lit during the brake application regardless of the integrity condition of the control circuits. Thus, if a brake application is made at a time relay 26 is deenergized to give a fault indication, the fault may be located and corrected, but the fault lamp 34 will remain lit until relay 26 is energized in response to a brake release. Similarly, if a brake application is made with the relay 26 energized to give an "all-clear" indication, and a fault occurs during the brake application, the "all-clear" lamp 33 will remain lit until a brake release is made and the fault causes the relay 26 to drop-out as previously explained to light the fault lamp 34.

Having now described my invention, what I claim as new and desire to secure by Letters Patent, is:

1. The combination with a plurality of circuits each extending from a control station to a point remote from said control station and adapted to be energized for a desired control purpose, of code transmitting means at the remote point for intermittently supplying coded electrical energy to said circuits successively in repeated cycles, a plurality of electro-responsive means each of which is connected to a corresponding one of the control circuits at the control station, operatively responsive to the supply of coded electrical energy from the remote point of said circuits, and an electro-responsive signal control relay means controlled by the cooperative operation of said plurality of electro-responsive means for effecting a no-fault indication.

2. The combination with a plurality of circuits each extending from a control station to a point remote from said control station and adapted to be energized for a desired control purpose, of code transmitting means at the remote point for supplying coded electrical energy to said circuits alternately in repeated cycles, a plurality of electro-responsive means each of which is connected to a corresponding one of the control circuits at the control station, operatively responsive to the supply of coded electrical energy from the remote point of said circuits, a condenser, said plurality of electro-responsive means cooperating to first establish a charging circuit for said condenser and then a discharging circuit therefor repeatedly while said code transmitting means operates and the integrity of said control circuits between the control station and the remote point is not impaired, and an electro-responsive signal control relay means actuable responsively to the current discharged from said condenser for effecting a no-fault indication.

3. The combination with a plurality of train circuits extending throughout a train of cars from a control station at the head end to the rear end of the train and adapted to be energized selectively for controlling the application and the release of the brakes on the train, of code transmitting means on the last car of the train for supplying coded electrical energy alternately to said circuits at a selected frequency of alternation, a pair of relays having windings connected to said circuits respectively at the head end of the train and operatively responsive to the coded electrical energy supplied from the code transmitting means, a condenser, a circuit for charging said condenser established by the cooperative action of said relays while the code transmitter is supplying coded electrical energy to one of said circuits, a circuit for discharging said condenser established by the cooperative relation of said relays when said code transmitter supplies coded electrical energy to the other of said circuits, and an electro-responsive signal control relay means operatively responsive to the current discharge in said condenser discharge circuit for indicating a no-fault condition of said circuits.

4. The combination with a plurality of train circuits extending throughout a train from a control station at the head end to the rear end of the train and adapted to be energized selectively for controlling the application and the release of the brakes on the train, of code transmitting means on the last car of the train for supplying coded electrical energy alternately to said circuits at a selected frequency of alternation, a pair of relays having windings connected to said circuits respectively at the head end of the train and operatively responsive to the coded electrical energy supplied from the code transmitting means, a condenser, a circuit for charging said condenser established by the cooperative action of said relays while the code transmitter is supplying coded electrical energy to one of said circuits, a circuit for discharging said condenser established by the cooperative action of said relays when said code transmitter supplies coded electrical energy to the other of said circuits, an electro-responsive signal control relay means operatively responsive to the current discharge in said condenser discharge circuit for indicating a no-fault condition of said circuits and responsive to the lack of current discharged from said condenser for more than a certain uniform length of time for effecting a fault indication.

5. For use in connection with a plurality of brake control circuits on a train of cars adapted to be energized from a control station on the train for applying and releasing the brakes on the train, apparatus for checking the integrity of the train wires comprising said control circuits, said apparatus including a code transmitter adapted to be located on the last car of the train and so connected as to supply coded electrical energy alternately to said circuits, and a receiving unit located at the head end of the train, said receiving unit including a pair of relays having windings connected respectively to said circuits at the head end of the train and being alternately actuated responsively to the coded electrical energy supplied by the code transmitter, a condenser, a charging circuit for said condenser established by the cooperative action of said relays when the code transmitter supplies electrical energy to one of said circuits, a discharge circuit for said condenser established by the cooperative action of said two relays when the code transmitter supplies coded electrical energy to the other of said circuits, an electro-responsive signal control relay means operatively responsive to the current discharged from said condenser in said discharge circuit for effecting a no-fault indication.

6. For use in connection with a plurality of brake control circuits on a train of cars adapted to be energized from a control station on the train for applying and releasing the brakes on the train, apparatus for checking the integrity of the train wires comprising said control circuits, said apparatus including a code transmitter adapted to be located on the last car of the train and so connected as to supply coded electrical energy alternately to said circuits, and a receiving unit located at the head end of the train, said receiving unit including a pair of relays each having a winding connected respectively to said circuits at the head end of the train and alternately actuated responsively to the coded electrical energy supplied by the code transmitter, a condenser, a charging circuit for said condenser established by the cooperative action of said relays when the code transmitter supplies electrical energy to one of said circuits, a discharge circuit for said condenser established by the cooperative action of said two relays when the code transmitter supplies coded electrical energy to the other of said circuits, an electro-responsive signal control relay means operatively responsive to the current discharged from said condenser in said discharge circuit for effecting a no-fault indication and actuated responsively to the cessation of discharge current from said condenser for longer than a certain uniform interval of time for indicating a fault condition of said circuit.

7. The combination with a pair of brake control circuits on a train of cars extending from a control station at the head end of the train to the rear of the train and adapted to be selectively energized for controlling the application and release of the brakes on the train, said control circuits having a common train wire, code transmitter means at the rear end of the train having an operating motor therefor, a circuit for supplying operating current to said motor from the control station at the head end of the train, said circuit including two train wires one of which is the common return wire of said brake control circuits, electro-responsive relay means located at the control station on said train and adapted to be energized by the coded electrical energy supplied over said control circuits by said code transmitter, a condenser, said relay means cooperating to alternately charge and discharge said condenser, and signal control means operatively responsive to the current discharge from said condenser.

8. For use in connection with a pair of brake control circuits on a train extending from a control station at the head end to the rear end of the train adapted to be selectively energized to control the application and the release of the brakes on the train, apparatus for checking the integrity of the train wires constituting said brake control circuits, said apparatus comprising a first unit and a second unit, said first unit including a code transmitter adapted to be connected to said circuits at the rear end of the train for supplying codel electrical energy to said brake control circuits alternately at a selected frequency of alternation, said second unit including a pair of relays the actuating windings of which are respectively connected to said control circuits at the head end of the train for actuating the relays alternately responsive to the alternate supply of coded electrical energy to the respective circuits by said code transmitting means, a condenser, a charging circuit for said condenser established by the cooperative action of said relays while said code transmitter supplies coded electrical energy to one of said circuits, a discharge circuit for said condenser established by the cooperative action of said relays when said code transmitter supplies coded electrical energy to the other of said brake control circuits, a signal control relay means having two actuating windings, one of which is energized responsively to the current discharged in said condenser discharge circuit to effect a no-fault indication, and means responsive to the energization of one of said brake control circuits incidental to effecting a brake application for preventing energization of said two relays by the coded electrical energy supplied by the code transmitter and for effecting energization of the other of the windings of said signal control relay means to maintain said relay in the position to effect a no-fault indication.

9. For use in connection with a pair of brake control circuits on a train extending from a control station at the head end to the rear end of the train adapted to be selectively energized to control the application and the release of the brakes on the train, apparatus for checking the integrity of the train wires constituting said brake control circuits, said apparatus comprising a first unit and a second unit, said first unit including a code transmitter adapted to be connected to said circuits at the rear end of the train for supplying coded electrical energy to said brake control circuits alternately at a selected frequency of alternation, said second unit including a pair of relays the actuating windings of which are respectively connected to said control circuits at the head end of the train for actuating the relays alternately responsive to the alternate supply of coded electrical energy to the respective circuits by said code transmitting means, a condenser, a charging circuit for said condenser established by the cooperative action of said relays while said code transmitter supplies coded electrical energy to one of said circuits, a discharge circuit for said condenser established by the cooperative action of said relays when said code transmitter supplies coded electrical energy to the other of said brake control circuits, electro-responsive relay means actuated responsively to current discharged in said condenser discharge circuit to effect a no-fault indication, means preventing a change in the position of said electro-responsive relay means so long as said condenser discharge circuit is not interrupted longer than a certain uniform interval of time, and means responsive to energization of at least one of said brake control circuits incidental to effecting a brake application for preventing the supply of coded electrical energy to either of said pair of relays.

10. For use in connection with a pair of brake control circuits on a train extending from a control station at the head end to the rear end of the train adapted to be selectively energized to control the application and the release of the brakes on the train, apparatus for checking the integrity of the train wires constituting said brake control circuits, said apparatus comprising a first unit and a second unit, said first unit including a code transmitter adapted to be connected to said circuits at the rear end of the train for supplying coded electrical energy to said brake control circuits alternately at a selected frequency of alternation, said second unit including a pair of relays the actuating windings of which are respectively connected to said control circuits at the head end of the train for actuating the relays alternately responsive to the alternate supply of coded electrical energy to the respective circuits by said code transmitting means, a condenser, a charging circuit for said condenser established by the cooperative action of said relays while said code transmitter supplies coded electrical energy to one of said circuits, a discharge circuit for said condenser established by the cooperative action of said relays when said code transmitter supplies coded electrical energy to the other of said brake control circuits, electro-responsive relay means actuated responsively to current discharged in said condenser discharge circuit to effect a no-fault indication, means preventing a change in the position of said electro-responsive relay means so long as said condenser discharge circuit is not interrupted longer than a certain uniform interval of time, means responsive to energization of at least one of said brake control circuits incidental to effecting a brake application for preventing the supply of coded electrical energy to either of said pair of relays, and an additional means responsive to a brake application exceeding a certain degree for also preventing the supply of coded electrical energy to said pair of relays.

11. For use in connection with the brake control circuits on a train of cars extending from a control station at the head end of the train to the rear of the train and adapted to be selectively energized from the control station to effect the application and release of the brakes on the train, apparatus for checking the integrity of the train wires constituting the said brake control circuits, said apparatus comprising a switch device for periodically and repeatedly supplying electrical energy to the brake control circuits at the rear end of the train, means at the head end of the train for receiving said electrical energy transmitted under the control of said switch device and responsive thereto to indicate the no-fault or fault condition of the train wires constituting said brake control circuits, a motor for operating said switch device, an electro-responsive means operative upon energization of any of said brake control circuits incidental to effecting a brake application for interrupting the supply of current subject to the control of said switch device without terminating operation of the motor for operating said switch device.

CLAUDE M. HINES.

REFERENCES CITED

The following references are of record in the file of this patent:

UNITED STATES PATENTS

| Number | Name | Date |
|---|---|---|
| 1,994,589 | O'Hogan | Mar. 19, 1935 |
| 2,010,840 | Baughman | Aug. 13, 1935 |

OTHER REFERENCES

Article on page 639 of the October 1947 issue of Railway Signalling.